United States Patent
Montemurro et al.

(10) Patent No.: US 11,841,264 B2
(45) Date of Patent: Dec. 12, 2023

(54) METHOD AND SYSTEM FOR CARGO LOADING DETECTION

(71) Applicant: BLACKBERRY LIMITED, Waterloo (CA)

(72) Inventors: Michael Peter Montemurro, Toronto (CA); Mahendra Fuleshwar Prasad, Waterloo (CA); Yu Gao, Waterloo (CA); Alexander Karl Levato, Toronto (CA); Scott Leonard Dill, Paris (CA); Cortez Corley, Waterloo (CA); Jason Wayne Jantzi, St. Clements (CA); Shouxing Qu, Gloucester (CA); Jesse William Bennett, Apex, NC (US)

(73) Assignee: BlackBerry Limited, Waterloo (CA)

( * ) Notice: Subject to any disclaimer, the term of this patent is extended or adjusted under 35 U.S.C. 154(b) by 762 days.

(21) Appl. No.: 16/283,584

(22) Filed: Feb. 22, 2019

(65) Prior Publication Data
US 2020/0271509 A1 Aug. 27, 2020

(51) Int. Cl.
*G01H 1/00* (2006.01)
*G06Q 10/0833* (2023.01)

(52) U.S. Cl.
CPC .......... *G01H 1/00* (2013.01); *G06Q 10/0833* (2013.01)

(58) Field of Classification Search
CPC ......... G01H 1/00; G01H 1/06; G06Q 10/0833
See application file for complete search history.

(56) References Cited

U.S. PATENT DOCUMENTS

| | | | | |
|---|---|---|---|---|
| 5,951,483 A | * | 9/1999 | Joo | A61B 5/7203 600/509 |
| 5,973,273 A | * | 10/1999 | Tal | G01G 19/08 177/1 |
| 7,472,002 B2 | | 12/2008 | McCann | |
| 2003/0123171 A1 | * | 7/2003 | Smith | G11B 21/21 |
| 2006/0293815 A1 | * | 12/2006 | McCann | B60G 17/01908 701/37 |
| 2009/0266650 A1 | * | 10/2009 | Utsunomiya | B66B 7/042 187/391 |
| 2015/0330867 A1 | * | 11/2015 | Potts | G01M 13/028 73/593 |
| 2016/0114809 A1 | | 4/2016 | Savaresi et al. | |
| 2016/0265960 A1 | * | 9/2016 | Watanabe | G01G 19/08 |

(Continued)

FOREIGN PATENT DOCUMENTS

| | | | | |
|---|---|---|---|---|
| EP | 2537007 B1 | | 12/2012 | |
| JP | 2004138553 | * | 5/2004 | ............. G01C 21/16 |

OTHER PUBLICATIONS

PCT/CA2020/050719, International Search Report and Written Opinion, dated Aug. 20, 2020.

(Continued)

*Primary Examiner* — Alexander Satanovsky
(74) *Attorney, Agent, or Firm* — Moffat & Co

(57) ABSTRACT

A method at a sensor apparatus affixed to a transportation asset, the method including detecting a trigger at the sensor apparatus; taking a threshold number of samples of a displacement-related value of the transportation asset over time; determining that a variance of the threshold number of samples exceeds a threshold; analyzing a frequency property based on the threshold number of samples; and based on the frequency property, determining whether the transportation asset is loaded or unloaded.

5 Claims, 11 Drawing Sheets

(56) References Cited

U.S. PATENT DOCUMENTS

2018/0172722 A1      6/2018  He et al.
2018/0361994 A1     12/2018  Seaman et al.
2022/0150581 A1*     5/2022  Sidhu .................. H04L 63/1483

OTHER PUBLICATIONS

PCT/CA2020/050226, International Search Report and Written Opinion, dated May 14, 2020.
EP Application No. 20758946.6, Extended European Search Report, dated Jan. 19, 2022.
Canadian Intellectual Property Office (CIPO) Official Action and Examination Search Report for Application No. 3,127,542 dated Oct. 17, 2023, 3 pages.

\* cited by examiner

METHOD AND SYSTEM FOR CARGO LOADING DETECTION

FIELD OF THE DISCLOSURE

The present disclosure relates to the transportation of goods, and in particular relates to cargo load detection of trailer chasses for the transportation of goods.

BACKGROUND

During the transportation of goods, determining whether a trailer is loaded is an important aspect of trailer asset management. With the transportation of shipping containers using tractor trailers, it is important to understand whether a trailer, referred to herein as a chassis, is loaded or not.

The information on vehicle loading may be beneficial to the transportation company. In particular, a transportation company managing a fleet of vehicles needs to know which vehicles are loaded and which vehicles are empty.

Typically, vehicle loading is determined by manual inspection, which is a cumbersome process that can be slow and inaccurate.

BRIEF DESCRIPTION OF THE DRAWINGS

The present disclosure will be better understood with reference to the drawings, in which.

DETAILED DESCRIPTION OF THE DRAWINGS

The present disclosure provides a method at a sensor apparatus affixed to a transportation asset, the method comprising: detecting a trigger at the sensor apparatus; taking a threshold number of samples of a displacement-related value of the transportation asset over time; determining that a variance of the threshold number of samples exceeds a threshold; analyzing a frequency property based on the threshold number of samples; and based on the frequency property, determining whether the transportation asset is loaded or unloaded.

The present disclosure further provides a sensor apparatus affixed to a transportation asset, the sensor apparatus comprising: a processor; and a communications subsystem, wherein the sensor apparatus is configured to: detect a trigger at the sensor apparatus; take a threshold number of samples of a displacement-related value of the transportation asset over time; determine that a variance of the threshold number of samples exceeds a threshold; analyze a frequency property based on the threshold number of samples; and based on the frequency property, determine whether the transportation asset is loaded or unloaded.

The present disclosure further provides a computer readable medium for storing instruction code, which, when executed by a processor of sensor apparatus affixed to a transportation asset cause the sensor apparatus to: detect a trigger at the sensor apparatus; take a threshold number of samples of a displacement-related value of the transportation asset over time; determine that a variance of the threshold number of samples exceeds a threshold; analyze a frequency property based on the threshold number of samples; and based on the frequency property, determine whether the transportation asset is loaded or unloaded.

In accordance with the embodiments described below, cargo load detection systems utilizing a vertical accelerometer and/or strain gauges are described.

In the embodiments described below, the load detection is performed on a trailer chassis which is connected to a tractor. However, in other cases, the measurements may be made on other shipping containers, including, but not limited to, railcars, trucks, automobiles, among others.

Figure 1:
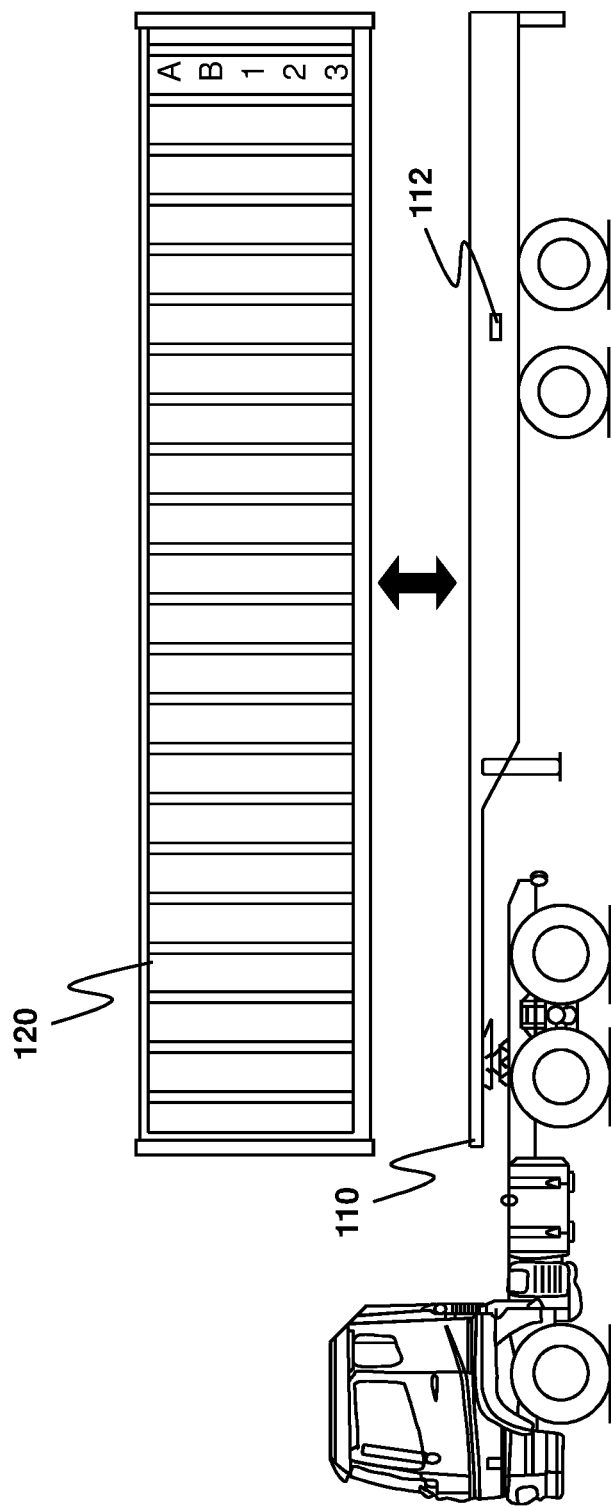
FIG. 1 is a side elevational view of a trailer chassis adapted to receive shipping containers, the figure showing an example placement of a sensor apparatus.

In order to perform load detection, a sensor apparatus may be affixed to a container, trailer, or other similar asset. Such sensor apparatus may be mounted inside of a chassis of a flatbed trailer configured to receive shipping containers. Reference is now made to FIG. 1.

In the embodiment of FIG. 1, example truck trailer 110 is shown. In one embodiment, the computing device may be mounted within the chassis of the trailer. For example, in one embodiment the computing device may be mounted above the rear wheels of the truck trailer 110. This is shown, for example, with sensor apparatus 112 in the embodiment of FIG. 1.

However, in other cases it may be beneficial to have a different position for the sensor apparatus. Further, in some embodiments it may be useful to have a plurality of such sensor apparatuses within the trailer 110.

The sensor apparatuses within trailer 110 may be used alone in some embodiments, or may be combined into sets of two or more sensor apparatuses and/or external sensors for load determination calculations.

In the embodiment of FIG. 1, trailer 110 is adapted to secure and carry a shipping container 120 thereon. Information on whether the shipping container 120 is present or not would be useful to a transportation company.

Apparatus

Figure 2:
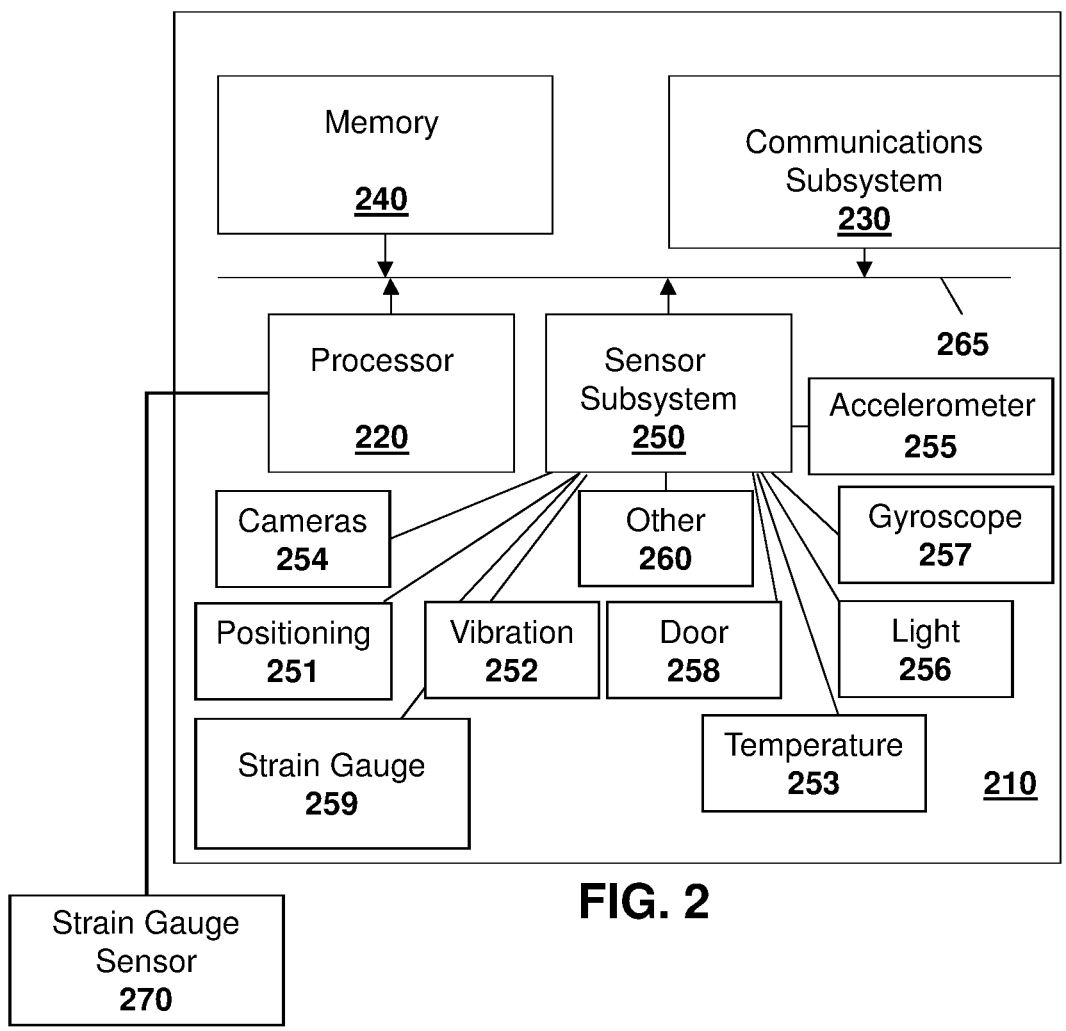
FIG. 2 is block diagram of an example sensor apparatus capable of being used between embodiments of the present disclosure.

One sensor apparatus for a vehicle, chassis, trailer, container, or other transportation asset is shown with regard to FIG. 2. The sensor apparatus of FIG. 2 is however merely an example and other sensing devices could equally be used in accordance with the embodiments of the present disclosure.

Reference is now made to FIG. 2, which shows an example sensor apparatus 210. Sensor apparatus 210 can be any computing device or network node. Such sensor apparatus or network node may include any type of electronic device, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows sensor apparatus 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), sub-giga hertz radios, near field communications (NFC), IEEE 802.15, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 230 will be dependent upon the communication network or communication technology on which the sensor apparatus is intended to operate.

Processor 220 generally controls the overall operation of the sensor apparatus 210 and is configured to execute programmable logic, which may be stored, along with data, using memory 240. Memory 240 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 240, sensor apparatus 210 may access data or programmable logic from an external storage medium (not shown), for example through communications subsystem 230.

In the embodiment of FIG. 2, sensor apparatus 210 may utilize a plurality of sensors, which may either be part of sensor apparatus 210 in some embodiments or may vg communicate with sensor apparatus 210 in other embodiments. For internal sensors, processor 220 may receive input from a sensor subsystem 250.

Examples of sensors in the embodiment of FIG. 2 include a positioning sensor 251, a vibration sensor 252, a temperature sensor 253, one or more image sensors/cameras 254, accelerometer 255, light sensors 256, gyroscopic sensors 257, a door sensor 258, a strain gauge 259, and other sensors 260. Other sensors may be any sensor that is capable of reading or obtaining data that may be useful for the sensor apparatus 210. However, the sensors shown in the embodiment of FIG. 2 are merely examples, and in other embodiments, different sensors or a subset of sensors shown in FIG. 2 may be used. For example, in some cases the only sensor may be an accelerometer or a strain gauge.

Further, accelerometer 255 would typically provide acceleration sensors in three dimensions. Thus, accelerometer 255 would generally include three individual accelerometers. The readings from each of the three individual accelerometers could be isolated.

Communications between the various elements of sensor apparatus 210 may be through an internal bus 265 in one embodiment. However, other forms of communication are possible.

In the embodiment of FIG. 2, rather than an internal strain gauge sensor 259, in some cases the strain gauge sensor may be external to the sensor apparatus and may be controlled by sensor apparatus 210. Strain gauge sensor 270 may, for example, be mounted together with sensor apparatus 210 or may form part of sensor apparatus 210. A single or multiple strain gauge sensors can be mounted on the longitudinal frame of the chassis to detect displacement when a container is loaded on the chassis. The strain gauge sensor may, in some embodiments, consist of a microprocessor, a strain gauge, a battery, and a short-range technology radio transmitter (Bluetooth, IEEE 802.15.4, or Wi-Fi). The sensor 270 could be configured to measure vertical displacement, or both vertical and horizontal displacement relative to the chassis.

The sensor apparatus 210 may communicate with the strain gauge sensor 270 or strain gauge 259 to query the strain gauge reading under a trigger condition. Examples of trigger conditions could be: on a regular wake-up schedule negotiated between the sensor(s) and the radar unit; when the trailer is in motion; and/or when the trailer stops, among other options.

A strain gauge will typically be displaced when the container is loaded and could be calibrated to estimate the relative or absolute weight of the container.

Sensor apparatus 210 may be affixed to any fixed or portable platform. For example, sensor apparatus 210 may be affixed to shipping containers or truck trailers in one embodiment. In other embodiments, sensor apparatus 210 may be affixed to a chassis of a trailer, as for example shown in FIG. 1. In other cases, the sensor apparatus 210 may be affixed to any transportation asset for which load detection is needed, including self-propelled vehicles (e.g., automobiles, cars, trucks, buses, etc.), railed vehicles (e.g., trains and trams, etc.), and other types of vehicles including any combinations of any of the foregoing, whether currently existing or after arising, among others.

In other cases, sensor apparatus 210 may be part of a container that could be carried on or within a vehicle, for example container 120 from FIG. 1. In accordance with the present disclosure, the term container may include any sort of cargo or item transportation such as vehicles, intermodal containers, shipping bins, lock boxes, and other similar vessels.

Such a sensor apparatus 210 may be a power limited device. For example, sensor apparatus 210 could be a battery-operated device that can be affixed to a shipping container or trailer in some embodiments. Other limited power sources could include any limited power supply, such as a small generator or dynamo, a fuel cell, solar power, energy harvesting, among other options.

In other embodiments, sensor apparatus 210 may utilize external power, for example from the battery or power system of a tractor pulling the trailer, via a wiring harness connected to a 7-pin plug, from a land power source for example on a plugged-in recreational vehicle or from a building power supply, among other options. Thus, the sensor apparatus 210 may also be connected to a power cord that receives its power from a power source.

External power may further allow for recharging of batteries to allow the sensor apparatus 210 to then operate in a power limited mode again. Recharging methods may also include other power sources, such as, but not limited to, solar, electromagnetic, acoustic or vibration charging.

The sensor apparatus from FIG. 2 may be used in a variety of environments. One example environment in which the sensor apparatus may be used is shown with regard to FIG. 3.

Figure 3:
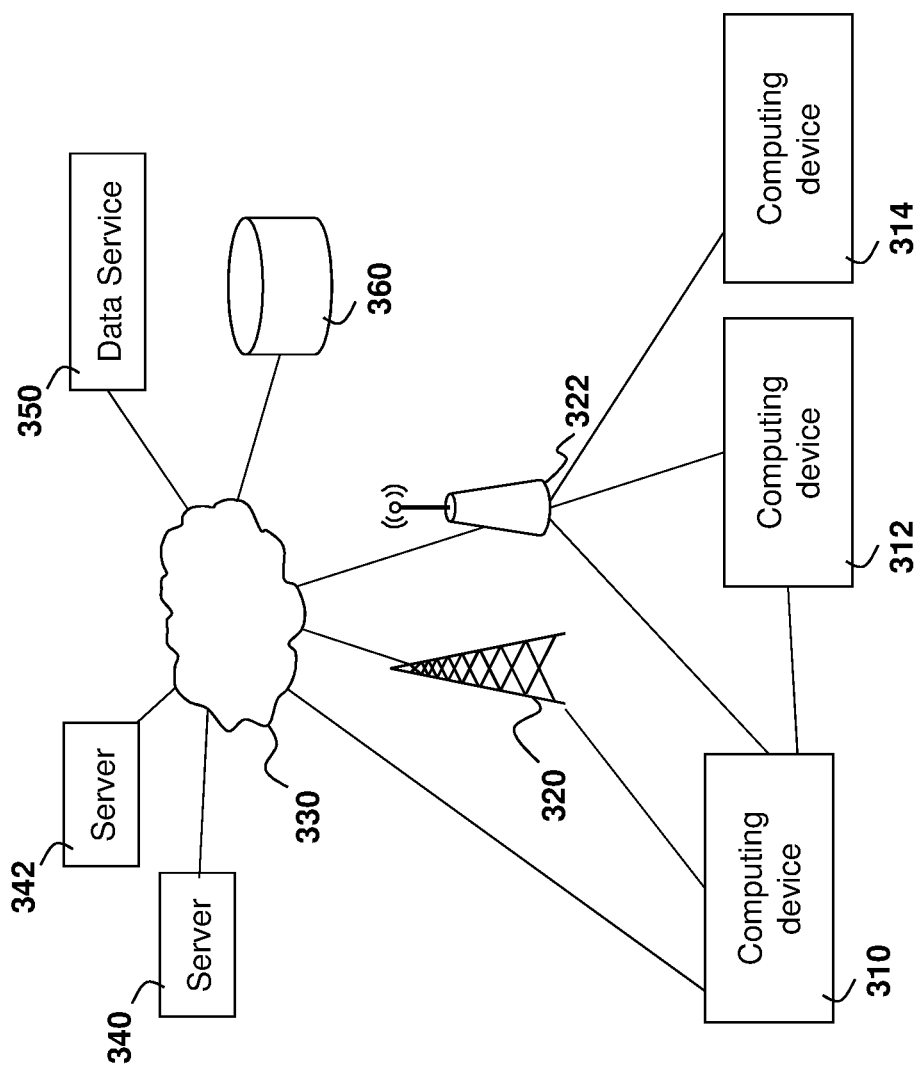
FIG. 3 is a block diagram showing an example architecture for the sensor apparatus of FIG. 2.

Referring to FIG. 3, three sensor apparatuses, namely sensor apparatus 310, sensor apparatus 312, and sensor apparatus 314 are provided.

In the example of FIG. 3, sensor apparatus 310 may communicate through a cellular base station 320 or through an access point 322. Access point 322 may be any wireless communication access point.

Further, in some embodiments, sensor apparatus 310 could communicate through a wired access point such as Ethernet or fiber, among other options.

The communication may then proceed over a wide area network such as Internet 330 and proceed to servers 340 or 342.

Similarly, sensor apparatus 312 and sensor apparatus 314 may communicate with server 340 or server 342 through one or both of the base station 320 or access point 322, among other options for such communication.

In other embodiments, any one of sensor apparatuses 310, 312 or 314 may communicate through satellite communication technology. This, for example, may be useful if the sensor apparatus is travelling to areas that are outside of cellular coverage or access point coverage.

In other embodiments, sensor apparatus 312 may be out of range of access point 322, and may communicate with sensor apparatus 310 to allow sensor apparatus 310 to act as a relay for communications.

Communication between sensor apparatus 310 and server 340 may be one directional or bidirectional. Thus, in one embodiment sensor apparatus 310 may provide information to server 340 but server 340 does not respond. In other cases, server 340 may issue commands to sensor apparatus 310 but data may be stored internally on sensor apparatus 310 until the sensor apparatus arrives at a particular location, possibly during a particular time window. In other cases, two-way communication may exist between sensor apparatus 310 and server 340.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of sensor apparatuses 310, 312, 314, etc. For example, the server may be located essentially anywhere so long as it has network access to communicate with sensor apparatuses 310, 312, 314, etc.

Server 340 may, for example, be a fleet management centralized monitoring station. In this case, server 340 may receive information from a sensor apparatus associated with various trailers or cargo containers, providing information such as the location of such cargo containers, the temperature within such cargo containers, any unusual events including sudden decelerations, temperature warnings when the temperature is either too high or too low, cargo loading within the trailer, the mass of the trailer, among other data. The server 340 may compile such information and store it for future reference.

Other examples of functionality for server 340 are possible.

In the embodiment of FIG. 3, servers 340 and 342 may further have access to third-party information or information from other servers within the network. For example, a data services provider 350 may provide information to server 340. Similarly, a data repository or database 360 may also provide information to server 340.

For example, data services provider 350 may be a subscription-based service used by server 340 to obtain current road and weather conditions, or may be an inventory control system in some cases.

Data repository or database 360 may for example provide information such as image data associated with a particular location, aerial maps, detailed street maps, or other such information.

The types of information provided by data service provider 350 or the data repository or database 360 is not limited to the above examples and the information provided could be any data useful to server 340.

In some embodiments, information from data service provider 350 or the data repository from database 360 can be provided to one or more of sensor apparatuses 310, 312, or 314 for processing at those sensor apparatuses.

A sensor apparatus such as that described in FIGS. 2 and 3 above may be used to detect trailer loading of a container or trailer.

Calculating Trailer Loading

In accordance with some embodiments of the present disclosure, the rear segment of a transportation vehicle or trailer can be modelled as a simple spring with a mass "m" representing the mass of the container and the mass of the chassis, and a spring constant "k", where k is the stiffness of the structure and suspension. Further, a damper which may be dependent on the suspension of the chassis is represented with a damping constant "c". For example, reference is now made to FIG. 4.

Figure 4:
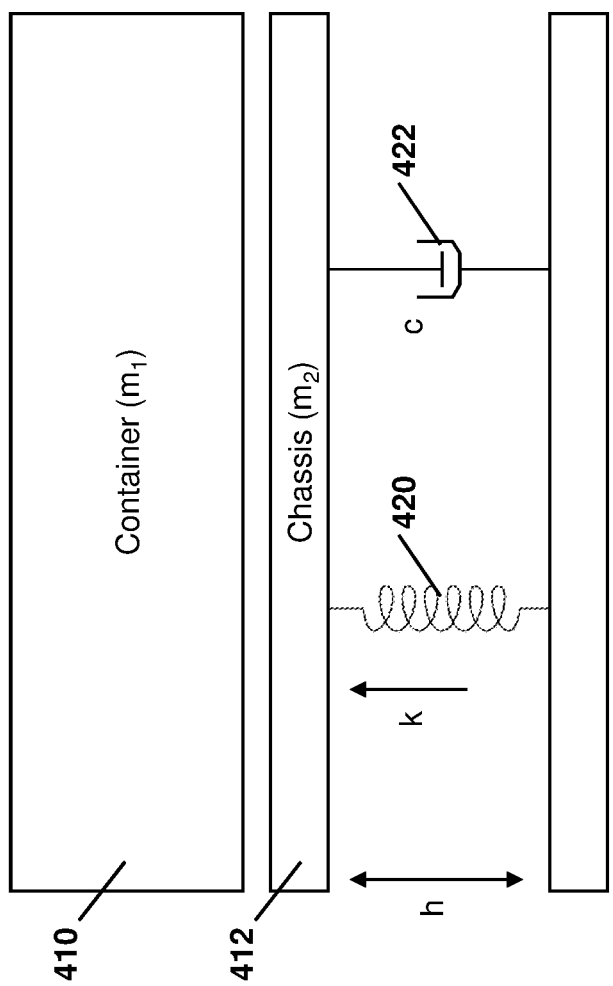
FIG. 4 is a block diagram showing a container and chassis acting on a spring and damper.

In the embodiment of FIG. 4, a container 410 has a mass "$m_1$". A chassis 412 has a mass "$m_2$". In the present disclosure, a mass "m" is the combination of masses $m_1$ and $m_2$.

A spring 420 is shown having a spring constant "k", which is representative of the stiffness of the structure and suspension.

Further, the damping constant "c" is shown using a representation 422 of the suspension.

A displacement "h" shows the amount of motion of the chassis from the rest position of the chassis towards the ground, for example when a bump is encountered by the chassis while the vehicle is operating.

The equation describing the motion of the chassis in one-dimension, using a single spring-damper, can be expressed as provided in equation 1 below:

$$m\frac{d^2h}{dt^2} = -kh - c\frac{dh}{dt} \quad (1)$$

In equation 1, m is the mass of the system, h is the displacement of the chassis from a rest position, t is time, k is the spring constant and c is the damping constant.

Solving equation 1 for the frequency of vibration yields equation 2:

$$f = \frac{1}{2\pi}\sqrt{\frac{k}{m}}\sqrt{1-\left(\frac{c}{2\sqrt{mk}}\right)^2} \quad (2)$$

Based on equation 2, the frequency of vibration is inversely proportional to the mass applied to the trailer. When the trailer is under the same moving conditions, the vibration frequency of the trailer will shift lower when a shipping container is loaded on the chassis.

If a truck, trailer or other similar asset is loaded within safe operating limits, the springs on the axles should not experience any significant deformations, which may affect the frequency of vibration.

The amplitude of the oscillations depends on the forces of any impacts between the wheels in the ground, but do not affect the frequency of vibration.

Figure 5:
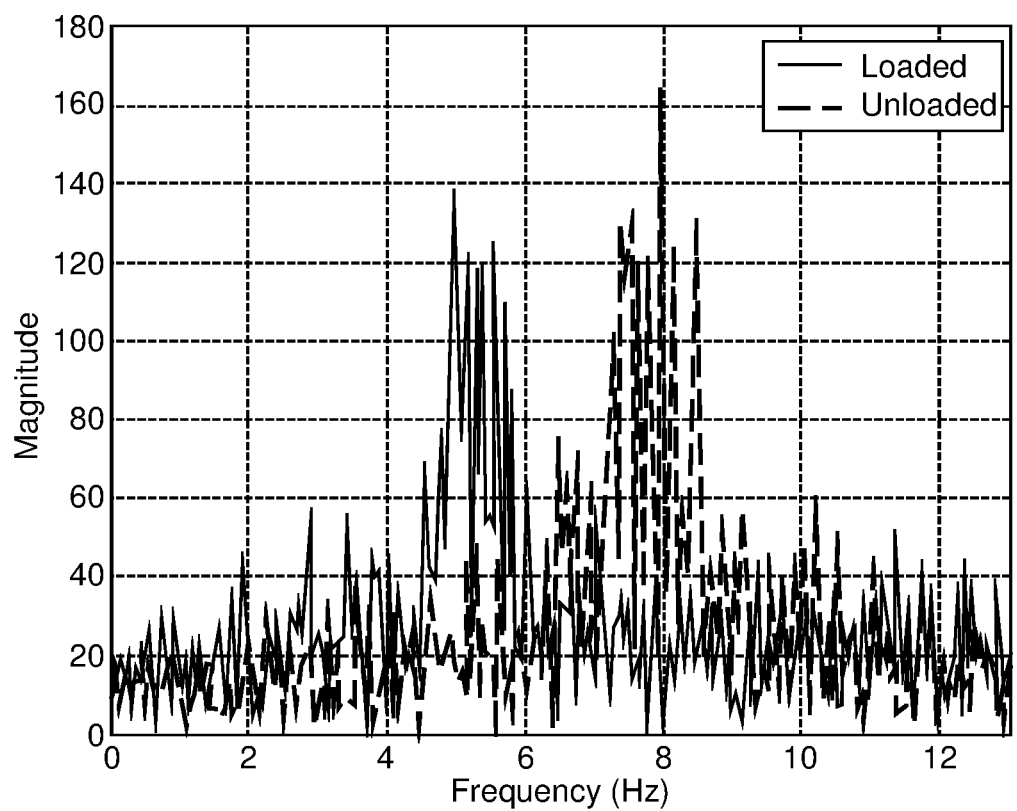
FIG. 5 is a plot showing the vibration magnitude as a function of frequency for a loaded and an unloaded chassis.

For example, reference is now made to FIG. 5, which shows an example plot of the vibration frequencies seen when a chassis is loaded or unloaded with a shipping container, respectively. As seen from FIG. 5, the frequency of the vibration shifts when the chassis is loaded.

Based on FIG. 5, by measuring the frequency of vibration as observed by an accelerometer in the vertical direction and/or by a strain gauge, a detection of whether the chassis or trailer is loaded can be made.

Using Bandpass Filters

Figure 6:
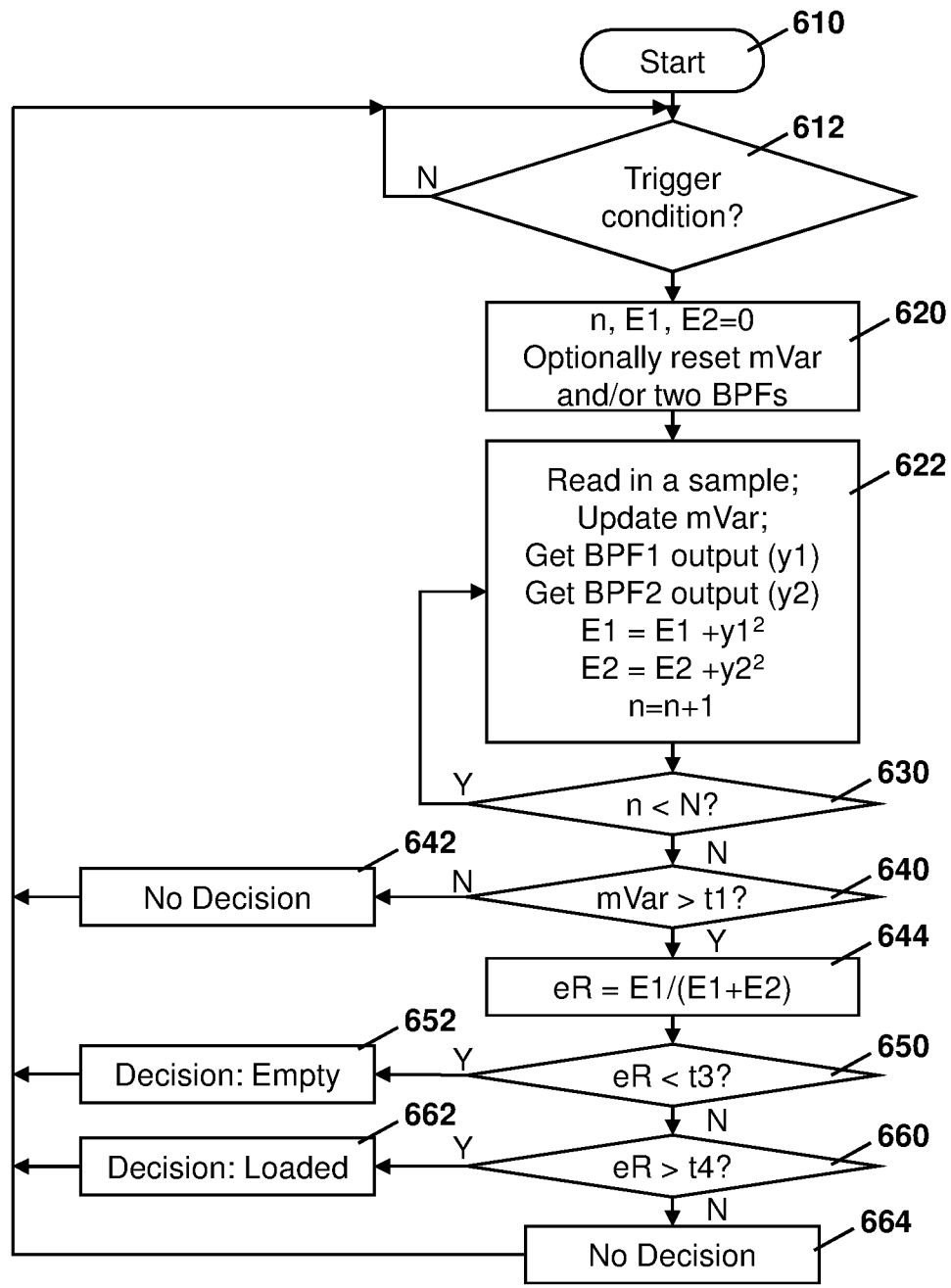
FIG. 6 is a process diagram showing a process to determine whether a chassis is loaded or unloaded utilizing two bandpass filters.

For example, one option for making a determination on whether a chassis has a container thereon is provided with regard to FIG. 6. However, the process of FIG. 6 is merely provided for illustration, and changes to the process of FIG. 6 could be made having regard to the other embodiments of the present disclosure.

The process of FIG. 6 starts at block 610 and proceeds to block 612 in which a check is made to determine whether a trigger condition has been met. The trigger condition could be any number of events that would indicate to the sensor apparatus that a reading needs to be made with regard to whether or not a container is loaded on the chassis.

For example, in one case, the trigger could be a message from a network server indicating that a determination should be made. This may be sent automatically by the network element periodically or may be sent based on input from an operator or transportation manager.

Figure 7:
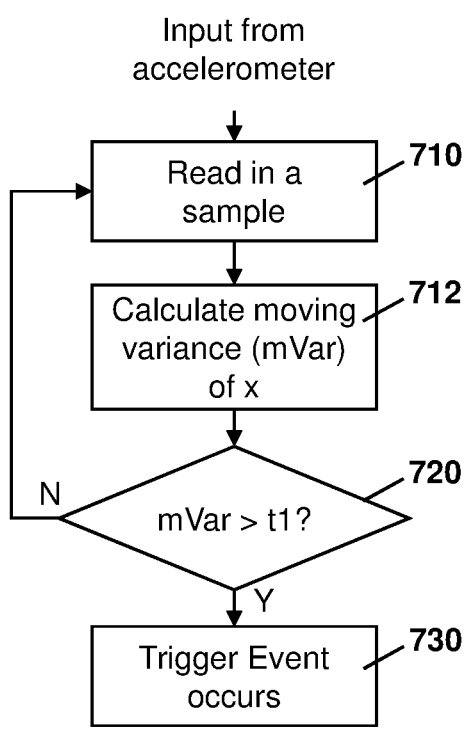
FIG. 7 is a process diagram showing a trigger process for starting and analysis on whether a chassis is loaded or unloaded.

In other cases, the trigger could be a determination by the sensor apparatus that the sensor apparatus is in motion. For example, reference is now made to FIG. 7. In the embodiment of FIG. 7, the process may receive input from an accelerometer on the sensor apparatus. In alternative embodiments, the input could be from a global positioning system or global navigation Satellite system sensor within or communicating with the sensor apparatus.

Upon receiving such input, the process could, at block 710, read in a sample from the accelerometer.

The process may then proceed to block 712 in which a moving variance of the acceleration of the chassis may be calculated.

From block 712, the process proceeds to block 720 in which a check is made to determine whether the moving variance calculated exceeds a threshold "t1". The threshold at t1 may be configured at the time that the sensor apparatus is deployed or provisioned on the sensor apparatus in some cases.

If the moving variance does not exceed the threshold, the process may proceed back to block 710 in which readings from the accelerometer may continue to be made. Specifically, if the moving variance does not exceed the threshold, then it is unlikely that the transportation asset is moving and that therefore there is no trigger condition.

Conversely, if it is determined that the moving variance exceeds the threshold at block 720, then the process proceeds to block 730 in which a trigger event may occur.

In other cases, the trigger event may be a combination of factors. For example, a determination that the vehicle is moving along with a time window may be used to create the trigger event. In this way, the trigger event is not met too frequently, thereby potentially draining the battery of the sensor apparatus less. The use of a combination of a time or signal event, along with a determination that the vehicle is moving, could be beneficial to ensure meaningful calculations can be made in the process of FIG. 6.

Other trigger events could equally be used at block 612 and the present disclosure is not limited to any particular trigger event.

If no trigger event is detected, the process will continue to loop at block 612 until the trigger event or condition is met.

Once a trigger condition is satisfied, the process proceeds to block 620 in which various variables may be reset. For example, a counter "n" may be used to count the number of samples received, and this counter may be reset to zero.

Further, as provided below, various bandpass filters could be used to find the energy within a particular band of the frequency spectrum. A first bandpass filter is denoted $BPF_1$ and a second bandpass filter is denoted $BPF_2$. For each sample of x, the output of $BPF_1$ is denoted as $y_1$ and the output of $BPF_2$ is denoted as $y_2$. The accumulated sum of squared value (ASSV) of $y_1$ is denoted as $E_1$ and the ASSV of $y_2$ is denoted as $E_2$.

In this regard, the $E_1$ and $E_2$ values may be reset to zero at block 620. Further, optionally a moving variance and/or the bandpass filters themselves may be reset.

The process then proceeds to block 622 in which a sample from an accelerometer or the strain gauge may be read. The acceleration measured may be reduced by subtracting the acceleration of gravity and that the moving variance may be updated based on the new sensor reading.

The bandpass filter outputs $y_1$ and $y_2$ may then be obtained.

Further, $E_1$ may be updated as $E_1=E_1+y_1^2$. $E_2$ may be updated as $E_2=E_2+y_2^2$.

The count of the samples may further be incremented, as shown at block 622 with n=n+1.

As will be appreciated by those in the art, using the calculation of block 622 allows for minimal use of memory resources at the sensor apparatus, since the raw data does not need to be stored.

From block 622, the process proceeds to block 630 and checks whether the number of samples has met a minimum number of sample threshold, denoted as N in the embodiment of FIG. 6. If not, the process proceeds back to block 622 to continue to collect samples.

Once the threshold number of samples has been taken, the process proceeds to block 640 in which a check is made to determine whether the moving variance exceeds a threshold t1. Similar to the discussion with regard to the moving variance in FIG. 7, if the threshold at t1 has not been exceeded, then the process may determine that a vehicle is not moving. In this case, the process may proceed to block 642 in which an indication that no decision may be made about the load status of the vehicle is noted, and the process proceeds back to block 612 to wait for the next trigger.

In some embodiments, optionally an additional check may be performed, to check whether the moving variance is too large as exceeding a second threshold denoted by t2 (not shown). That is, if the moving variance exceeds t2, the process may proceed to block 642 in which an indication that no decision may be made about the load status of the vehicle is noted, and the process proceeds back to block 612 to wait for the next trigger.

Conversely, if the moving variance exceeds the threshold t1 and optionally does not exceed the threshold t2, then the process may proceed from block 640 to block 644 in which an energy ratio "eR" may be calculated. In particular, the energy ratio may be calculated with regard to equation 3 below.

$$eR = \frac{E_1}{E_1 + E_2} \quad (3)$$

From equation 3 above, the energy ratio compares the ASSV from the first bandpass filter to the total ASSV of both bandpass filters. As seen in FIG. 5 above, since the first bandpass filter allows to pass signal in a lower frequency band than a higher frequency band that the second bandpass filter allows to pass, the energy ratio is reflective of the ASSV of the lower frequency band compared to the combined ASSV of both bandpass filters.

From block 644, the process proceeds to block 650 in which a check is made to determine whether the energy ratio is less than a threshold t3. The threshold t3 may be a value that is based on the particular type of chassis on which the sensor apparatus is mounted and may be provisioned to the sensor apparatus or may be determined through a calibration process as described below.

If the energy ratio is less than the threshold to t3, the process proceeds to block 652 in which decision is made at that the chassis is empty.

From block 652, the process may proceed back to block 612 to wait for a further trigger condition.

Conversely, if the energy ratio is not less than a threshold t3, then the process proceeds to block 660 in which a check is made to determine whether the energy ratio is greater than a threshold t4. The value of the threshold t4 again may be determined based on the type of chassis, and may be provisioned at the sensor apparatus or determined through calibration in some cases.

If the energy ratio exceeds the threshold t4 then the process proceeds to block 662 in which a determination is made that that the chassis is loaded. The process then proceeds to block 612 to wait for the next trigger.

If the energy ratio does not exceed the threshold t4 then the process proceeds to block 664 in which no decision on the loading status of the chassis is made. For example, this may occur if the value of the energy ratio falls between the thresholds t3 and t4. This range may indicate that a definitive determination cannot be made.

From block 664, the process proceeds back to block 612 to wait for the next trigger condition.

In practice, two $3^{rd}$ order infinite impulse response (IIR) Butterworth bandpass filters have been utilized. However, the present disclosure is not limited to this particular order and type of a filter, and other IIR filters such as Elliptic, Bessel, Chebyshev type I, or Chebyshev type II filters could be used, for example. In other cases, finite impulse response (FIR) filters could be used.

The use of the bandpass filter rather than a low-pass filter avoids calculating a DC component of the data sequence x and further avoids the normalization of an output $y_2$ from a low-pass filter.

Figure 8:
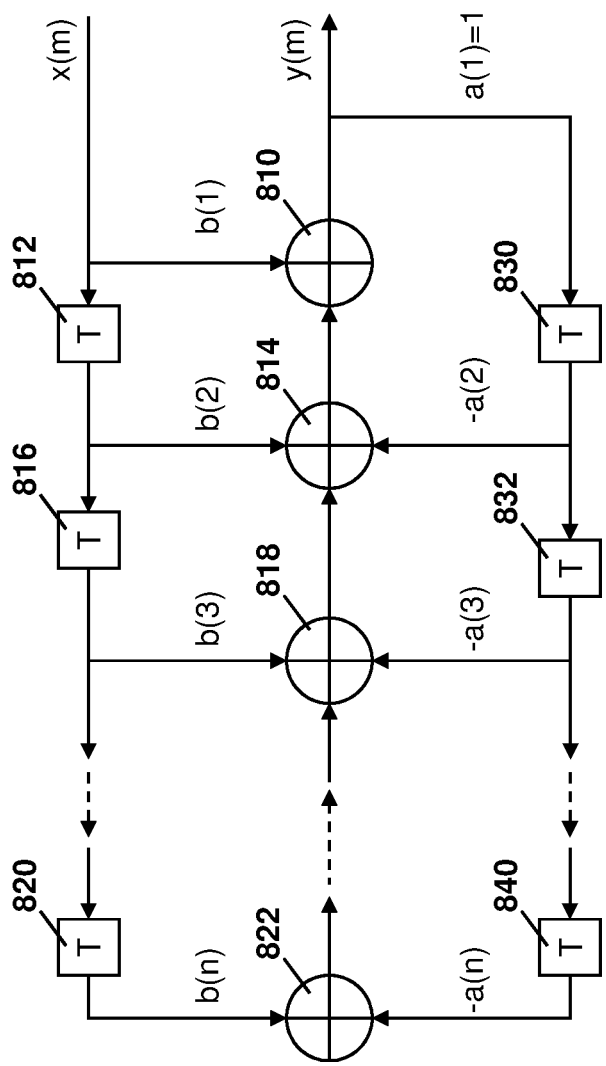
FIG. 8 is a block diagram showing an example infinite impulse response bandpass filter.

One example structure of an IIR filter is shown with regard to FIG. 8. In particular, in the embodiment of FIG. 8, an input sequence x(m) results in output sequence y(m) using equation 4 below:

$$y(m) = \quad (4)$$
$$b(1)x(m) + b(2)x(m-1) + b(3)x(m-2) + \ldots + b(n)x(m-n+1) -$$
$$a(2)y(m-1) - a(3)y(m-2) - \ldots - a(n)y(m-n+1)$$

Equation 4 can be represented as:

$$y(m) = \Sigma_{k=1}^{n} b(k)x(m-k+1) - \Sigma_{k=2}^{n} a(k)y(m-k+1) \quad (5)$$

Which can be further simplified to:

$$y(m) = b\hat{x} - a\hat{y} \quad (6)$$

Where a={a(k)} and b={b(k)} are two sets of coefficients of the filter, k=1,2, . . . , n, a(1)=1 and $\hat{x}$ and $\hat{y}$ are vectors:

$$\hat{x} = [x(m)x(m-1)x(m-2) \ldots x(m-n+1)]^T \quad (7)$$

and:

$$\hat{y} = [0 \; y(m-1)y(m-2) \ldots y(m-n+1)]^T \quad (8)$$

In equation 7 and 8 above, T is the matrix transpose.

Using equations 4 to 8 above, FIG. 8 shows the general structure of the IIR filter. In particular, the input x(m) is provided to both an adder 810 as b(1)x(m), as well as a time delay 812.

The output from the time delay 812 is provided to adder 814 as b(2)x(m−1), and is further provided to time delay 816. The output from time delay 816, which is b(3)x(m−2), is provided to adder 818.

The process continues until the time delay at time n, shown at block 820, provides its output b(n)x(m−n+1) to adder 822.

A feedback loop from output y(m) is provided to a time delay 830, where a(1)=1.

The output from time delay 830 is provided to adder 814 as −a(2)y(m−1). The output y(m−1) is also provided to a time delay 832. The output from time delay 832 is provided it to adder 818 as −a(3)y(m−2).

The process then continues until a time delay 840 is encountered, where the output from this time delay is provided to adder 820 to as −a(n)y(m−n+1).

Further, the output from each adder is provided to the previous adder. In this way, the output of the BFP, y(m), can be found.

Thus, the embodiments of FIGS. 6 to 8 provide a way to find a ratio of the signal energy in a first frequency band compared with the signal energy in both frequency bands in order to make a decision on whether a chassis is loaded.

While the embodiments of FIGS. 6 to 8 are provided with regards to a chassis, in other cases, the embodiment of FIGS. 6 to 8 could equally be used with a closed or open trailer to determine whether a load is found within or on such trailer.

Further, while the embodiment of FIG. 6 describes all calculations occurring at the sensor apparatus, in some cases the computing may be better done at a server. In this case, various information from the sensors associated with sensor apparatus may be provided back to a server, which may then use defined threshold and filter values to make a determination on whether the chassis is loaded or not.

Frequency Response Calculation

While the embodiment of FIGS. 6 to 8 is done in the time domain, another possible option is to estimate whether a chassis has a load in the frequency domain. For example, a Fourier transform (FT) may be applied to a signal such as the accelerometer samples. The Fourier transform may then be used to find the frequency with a peak magnitude. An effective way to do this is to utilize the Fast Fourier Transform (FFT) algorithm.

Figure 9:
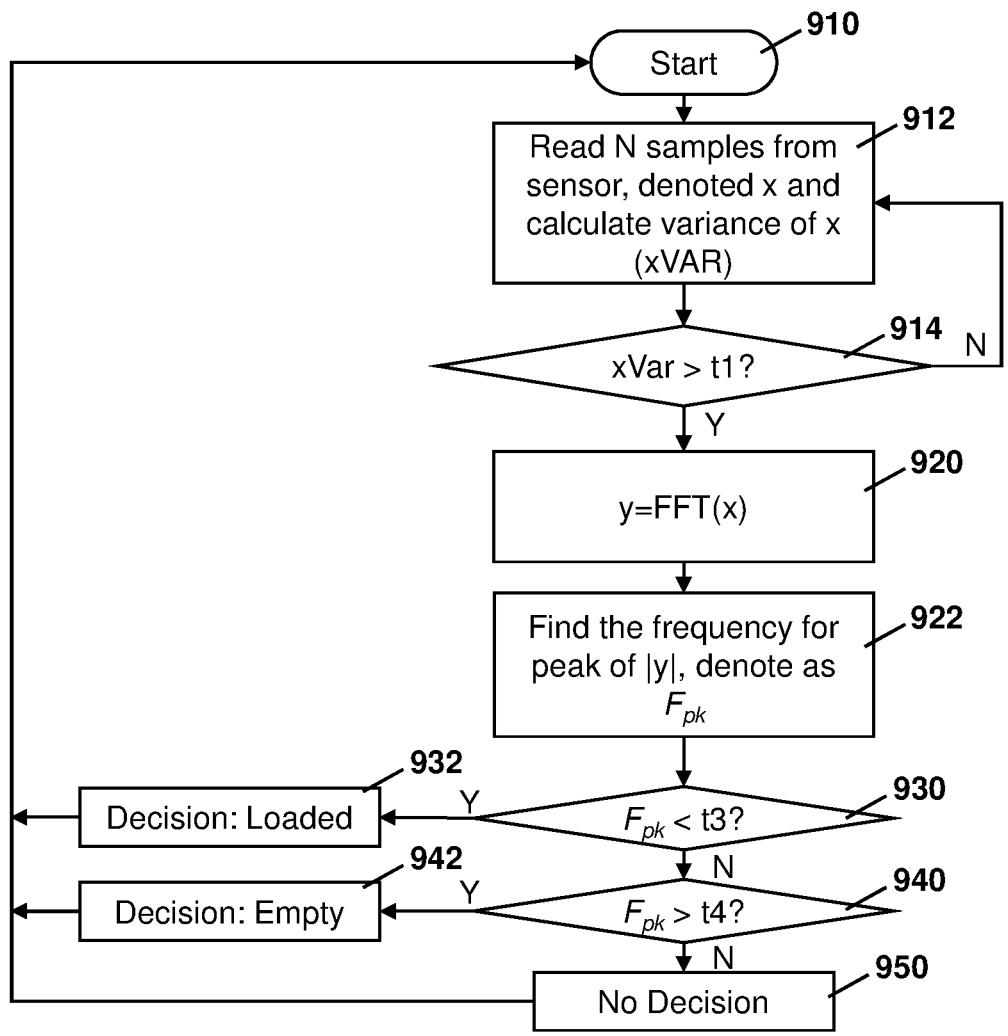
FIG. 9 is a process diagram showing a frequency domain analysis of sensor readings to determine whether a chassis is loaded or unloaded.

Reference is now made to FIG. 9. In the embodiment of FIG. 9 the process starts at block 910. For example, the process may start based on a trigger condition being met. As described above with regard to FIG. 7, the trigger condition can be one or a combination of factors, including time-based factors, signaling from network elements, and/or determinations that the vehicle is moving.

From block 910, the process proceeds to block 912 in which N samples are read from a sensor such as an accelerometer or a strain gauge, where each sample is denoted as "x". The samples may be denoted in accordance with equation 9 below.

$$x=\{x_k\}, \text{ where } k=0,1,\ldots,N-1 \quad (9)$$

The variance of x (denoted as xVar) may then be found.

The process then proceeds to block 914 in which a check is made to determine whether xVar is greater than a threshold "t1". The threshold t1 may be found based on a calibration sequence or may be based on provisioning of the sensor apparatus. Therefore, blocks 912 and 914 make a determination on whether the vehicle is moving.

In some cases, the process of blocks 912 and 914 may be optional if the trigger condition that started the process at block 910 includes a determination that the vehicle is moving. In this case, the blocks may be substituted by a process in which a number of samples N is read.

From block 914, the process proceeds to block 920 in which N values (denoted by y) can be obtained by applying a Fourier Transform to x. In particular, y is denoted in accordance with equation 10 below.

$$y=\{y_k\}, \text{ where } k=0,1,\ldots,N-1 \quad (10)$$

In equation 10, k from 0 to N/2 corresponds to the frequency from 0 Hz to $f_s/2$ Hz respectively, with $f_s$ being the sampling frequency (or equivalently, sampling rate), while k from (N/2+1) to (N−1) corresponds to negative frequencies which are out of the topic of this document.

While block 920 uses a Fast Fourier Transform, in other cases, the Fourier transform may be performed in other ways. Therefore, the present disclosure is not limited to using Fast Fourier Transforms.

From block 920, the process proceeds to block 922 in which the peak frequency is found, denoted as $F_{pk}$. In general, the peak frequency is found by search for $|y(F_{pk})|$, such that $|y(F_{pk})|$ is the maximum among $\{y_k\}$ for $k_1 \leq k \leq k_2$, where $k_1 > 0$ and $k_2 < N/2$.

From block 922, the process proceeds to block 930 in which a check is made to determine whether $F_{pk}$ is less than a threshold "t3". In block 930, $F_{pk}$ is also greater than a threshold equivalent to $k_1$ as specified above to block the DC component. The value for the threshold t3 may be based on provisioning to the sensor apparatus based on the type of trailer, vehicle or chassis that the sensor apparatus is affixed to, may be found through calibration, among other options.

If $F_{pk}$ is less than the threshold t3 then the process proceeds to block 932 in which a determination is made that the chassis is loaded. From block 932, the process proceeds back to block 910 in which the process may start over, for example when a trigger condition is met.

Conversely, if $F_{pk}$ is greater than the threshold t3 then the process proceeds to block 940. At block 940, a check is made to determine whether $F_{pk}$ is greater than a threshold "t4". The value for the threshold t4 may be based on provisioning to the sensor apparatus based on the type of trailer, vehicle or chassis that the sensor apparatus is affixed to, may be found through calibration, among other options.

If $F_{pk}$ is greater than the threshold t4 then the process proceeds to block 942 in which a determination is made that the chassis is empty. From block 942, the process proceeds back to block 910 in which the process may start over, for example when a trigger condition is met.

If $F_{pk}$ is neither less than the threshold t3 nor greater than the threshold t4 then the process proceeds to block 950 in which no decision on the loaded status of the chassis may be made. For example, this may occur if the peak is found between thresholds t3 and t4. From block 950, the process proceeds back to block 910 in which the process may start over, for example when a trigger condition is met.

Therefore, based on FIG. 9, the loaded status of the chassis may be found through an analysis of the peak frequency in the frequency domain.

While the embodiment of FIG. 9 is provided with regards to a chassis, in other cases, the embodiment of FIG. 9 could equally be used with a closed or open trailer to determine whether a load is found within or on such trailer.

Further, while the embodiment of FIG. 9 describes all calculations occurring at the sensor apparatus, in some cases the computing may be better done at a server. In this case, various information from the sensors associated with sensor apparatus may be provided back to a server, which may then use defined threshold values to make a determination on whether the chassis is loaded or not.

Calibration

As indicated above, when a sensor apparatus is first installed on a chassis or container, the system may be calibrated to allow for load detection on the trailer.

In one example, a data set may exist at a server and the type of trailer or chassis may be input into the sensor apparatus. At this point, the sensor apparatus may be provisioned with the values for the filter and the thresholds for the embodiment of FIG. 6 or with the threshold values for the embodiment of FIG. 9.

In an alternative embodiment, when first installed, or at some subsequent point, a calibration mode may be entered into at the sensor apparatus. For example, the calibration mode can be manually configured, for example by pressing a button or otherwise locally interacting with that the sensor apparatus, or based on a command from a remote server. Once in calibration mode, the chassis that the sensor apparatus is affixed to is caused to have a vertical impact. For example, in one embodiment the vertical impact may involve driving the vehicle over a drop to initiate the spring response. However, in other cases, the vertical impact may be experienced simply by driving the vehicle over a normal road.

During calibration, manual input on whether the chassis is loaded or unloaded may be provided to allow for the threshold values and/or the filter parameters to be set at the sensor apparatus.

In some cases, calibration mode may be entered multiple times, for example when the chassis is empty and when the chassis is loaded to obtain accurate values for the thresholds and/or the filter values.

Further, in some cases, the filter values and thresholds derived for that particular trailer or chassis could be provided back to a network element for storage for future deployment of sensor apparatuses on similar chasses.

Practical Example

The embodiments of FIGS. 6 to 8 above were tested on a chassis of trailer. With this practical testing at a sampling rate equal to 50 samples per second, it was designed such that the first bandpass filter had a lower cut-off frequency equal to 2 Hz and an upper cut-off frequency equal to 6.5 Hz. Correspondingly, the filter coefficients, a and b were calculated as:

$$a=[1, -4.3755, 8.3673, -8.9674, 5.6906, -2.0274, 0.31743] \quad (11)$$

and $$b=[0.01382, 0, -0.04146, 0, 0.04146, 0, -0.01382] \quad (12)$$

The second bandpass filter had a lower cut-off frequency equal to 6.5 Hz and an upper cut-off frequency equal to 11 Hz. The coefficients for this second bandpass filter were calculated as:

$$a=[1, -2.3078, 3.6859, -3.4937, 2.5284, -1.0693, 0.31743] \quad (13)$$

and $$b=[0.01382, 0, -0.04146, 0, 0.04146, 0, -0.01382] \quad (14)$$

Using the above coefficients, the process of FIG. 6 was implemented in which the number of samples N was set to 1024, the bandpass filter order was three, t1 was set to 1, t3 was set to 0.4, and t4 was set to 0.6.

Figure 10:
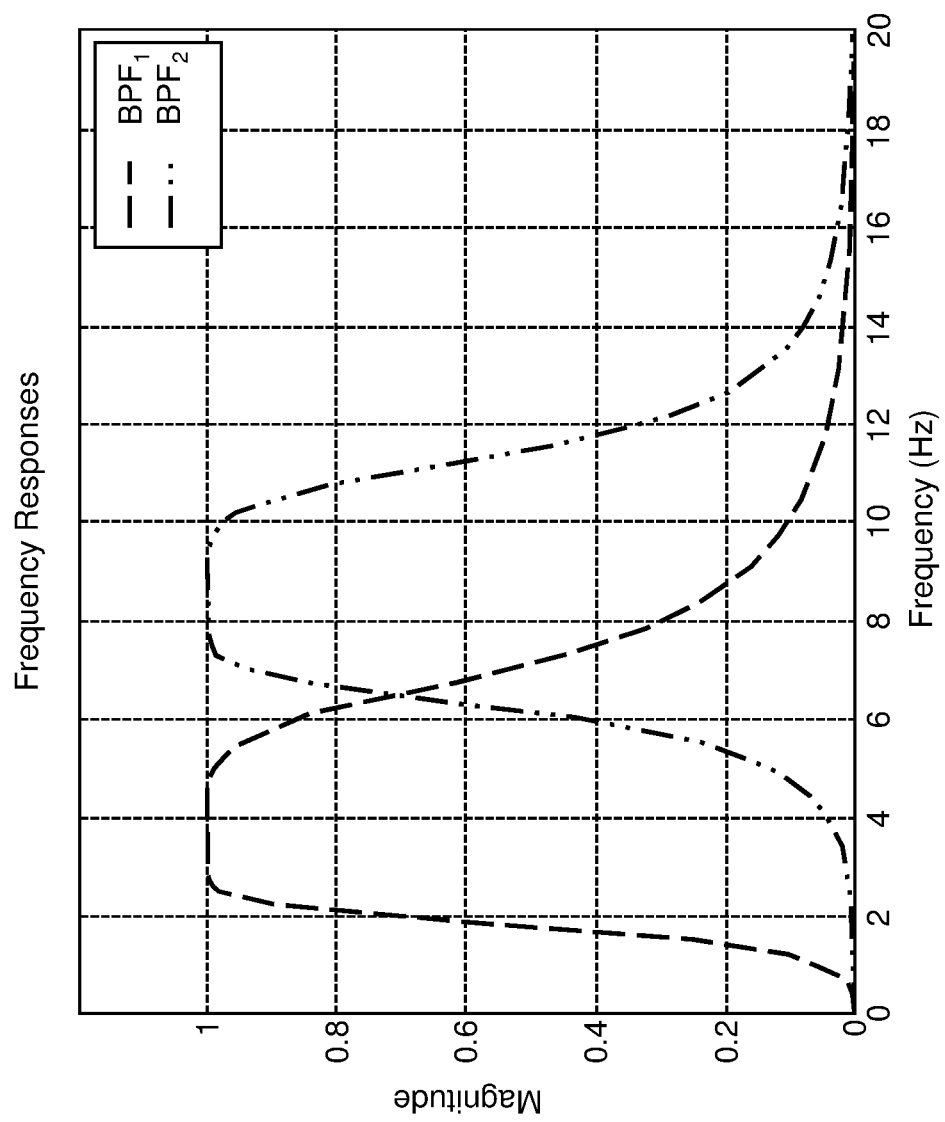
FIG. 10 is a plot showing frequency responses of the bandpass filters utilized in a practical test utilizing the process of FIG. 6.

Utilizing these values, the frequency responses of the two designed bandpass filters are shown with regard to FIG. 10.

While the embodiment of FIG. 6 or FIG. 9 shows only one test, in other cases improvements in reliability could be achieved by performing the test a number of times. For example, if the three tests were done, if two of the tests preferred "loaded" and one prefers "unloaded", the decision would be "loaded".

In other cases, a final decision may be based on a combined energy ratio value for multiple tests, where the combined energy ratio is a weighted sum of multiple individual energy ratios obtained from multiple tests and where each weight is associated with an individual energy ratio.

In other cases, the loading status typically would not change back-and-forth repeatedly in a short period of time. Thus, if a sudden change in the decision occurs following a relatively long period with a stable status, more tests may be performed and no decision may be made until a reliable conclusion is obtained.

A server such as servers 340, 342 or 350 may be any network node. For example, one simplified server that may perform the embodiments described above is provided with regards to FIG. 11.

Figure 11:
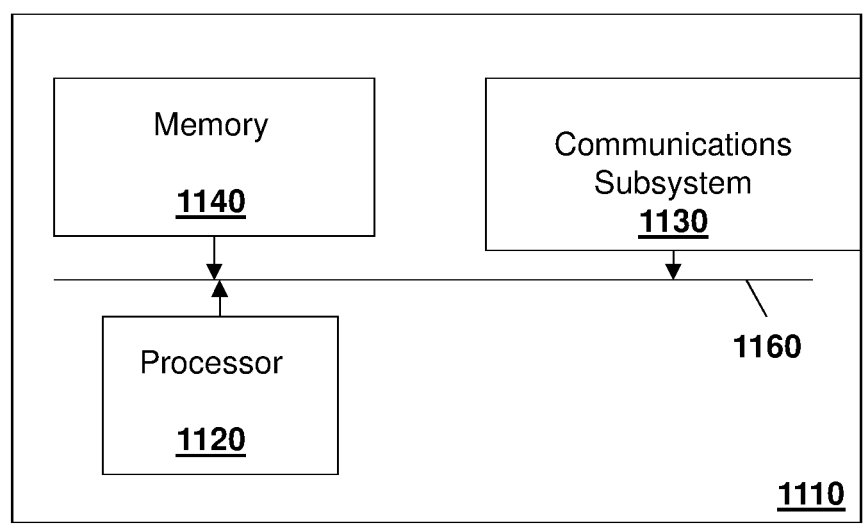
FIG. 11 is a block diagram of an example computing device or server capable of being used with the embodiments of the present disclosure.

In FIG. 11, server 1110 includes a processor 1120 and a communications subsystem 1130, where the processor 1120 and communications subsystem 1130 cooperate to perform the methods of the embodiments described herein.

The processor 1120 is configured to execute programmable logic, which may be stored, along with data, on the server 1110, and is shown in the example of FIG. 11 as memory 1140. The memory 1140 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1120 may also be implemented entirely in hardware and not require any stored program to execute logic functions.

Alternatively, or in addition to the memory 1140, the server 1110 may access data or programmable logic from an external storage medium, for example through the communications subsystem 1130.

The communications subsystem 1130 allows the server 1110 to communicate with other devices or network elements.

Communications between the various elements of the server 1110 may be through an internal bus 1160 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a sensor apparatus affixed to a chassis of a motor vehicle, the motor vehicle comprising a cargo area, the method comprising:
   detecting a trigger condition at the sensor apparatus;
   taking a threshold number of samples of a displacement-related value of the motor vehicle over time, wherein taking a threshold number of samples comprises, for each sample:
      determining a first bandpass filter output;
      determining a second bandpass filter output;
      determining an accumulated sum of squared values for the first bandpass filter output; and
      determining an accumulated sum of squared values for the second bandpass filter output;
   determining that a number of samples exceeds a first threshold;
   finding an energy ratio of the accumulated sum of squared values for the first bandpass filter output over the combined accumulated sum of squared values for the first and second bandpass filter outputs;
   finding that the motor vehicle asset is unloaded when the energy ratio is less than a second threshold;
   finding that the motor vehicle is loaded when the energy ratio is greater than a third threshold; and
   transmitting a loading status of the motor vehicle to a server.

2. The method of claim 1, further comprising finding that a loaded status of the motor vehicle is not available when the energy ratio is between the second threshold and the third threshold.

3. A sensor apparatus affixed to a chassis of a motor vehicle, the motor vehicle comprising a cargo area, the sensor apparatus comprising:
   a processor; and
   a communications subsystem,
   wherein the sensor apparatus is configured to:
      detect a trigger condition at the sensor apparatus;
      take a threshold number of samples of a displacement-related value of the motor vehicle over time, wherein taking a threshold number of samples comprises, for each sample:
         determining a first bandpass filter output;
         determining a second bandpass filter output;
         determining an accumulated sum of squared values for the first bandpass filter output; and
         determining an accumulated sum of squared values for the second bandpass filter output;
      determine that a number of samples exceeds a first threshold;
      finding an energy ratio of the accumulated sum of squared values for the first bandpass filter output over the combined accumulated sum of squared values for the first and second bandpass filter outputs;
      finding that the transportation asset is unloaded when the energy ratio is less than a second threshold;
      finding that the transportation asset is loaded when the energy ratio is greater than a third threshold; and
      transmit a loading status of the motor vehicle to a server.

4. The sensor apparatus of claim 3, wherein the sensor apparatus is further configured to find that a loaded status of the motor vehicle is not available when the energy ratio is between the second threshold and the third threshold.

5. A computer readable medium for storing instruction code, which, when executed by a processor of sensor apparatus affixed to a chassis of a motor vehicle, the motor vehicle comprising a cargo area, cause the sensor apparatus to:
   detect a trigger condition at the sensor apparatus;
   take a threshold number of samples of a displacement-related value of the motor vehicle over time, wherein taking a threshold number of samples comprises, for each sample:
      determining a first bandpass filter output;
      determining a second bandpass filter output;

determining an accumulated sum of squared values for the first bandpass filter output; and determining an accumulated sum of squared values for the second bandpass filter output;

determine that a number of samples exceeds a first threshold;

finding an energy ratio of the accumulated sum of squared values for the first bandpass filter output over the combined accumulated sum of squared values for the first and second bandpass filter outputs;

finding that the motor vehicle is unloaded when the energy ratio is less than a second threshold;

finding that the motor vehicle is loaded when the energy ratio is greater than a third threshold; and transmit a loading status of the motor vehicle to a server.

* * * * *